US012580993B2

(12) United States Patent
Kweon et al.

(10) Patent No.: US 12,580,993 B2
(45) Date of Patent: Mar. 17, 2026

(54) METHOD AND APPARATUS FOR DISCOVERING USER PLANE FUNCTION UPF IN WIRELESS COMMUNICATION SYSTEM

(71) Applicant: Samsung Electronics Co., Ltd., Suwon-si (KR)

(72) Inventors: Kisuk Kweon, Suwon-si (KR); Naman Gupta, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 18/667,344

(22) Filed: May 17, 2024

(65) Prior Publication Data

US 2024/0388641 A1     Nov. 21, 2024

(30) Foreign Application Priority Data

May 19, 2023     (KR) ......................... 10-2023-0065193

(51) Int. Cl.
H04L 67/51          (2022.01)
(52) U.S. Cl.
CPC ................................... H04L 67/51 (2022.05)
(58) Field of Classification Search
None
See application file for complete search history.

(56) References Cited

U.S. PATENT DOCUMENTS

2019/0090298 A1     3/2019  Abraham et al.
2022/0279319 A1     9/2022  Baek et al.
(Continued)

FOREIGN PATENT DOCUMENTS

WO        2022/008951 A1     1/2022
WO        WO-2022067736 A1 *  4/2022   ............ H04L 67/14
WO        WO-2024205942 A1 * 10/2024   ......... H04L 61/2514

OTHER PUBLICATIONS

3GPP, 3rd Generation Partnership Project, Technical Specification Group Services and System Aspects, Study on UPF enhancement for Exposure and SBA (Release 18), 3GPP TR 23.700-62, V18.0.0, Mar. 2023.

(Continued)

*Primary Examiner* — Lance Leonard Barry
(74) *Attorney, Agent, or Firm* — Jefferson IP Law, LLP

(57)               ABSTRACT

The disclosure relates to a 5$^{th}$ generation (5G) or 6$^{th}$ generation (6G) communication system for supporting a higher data transmission rate. A method performed by a serving user plane function (UPF) entity in a wireless communication system, the method comprising: receiving, from an application function (AF) entity, a request message for requesting a discovery on the serving UPF entity or a session management function (SMF) entity, for a subscription on a service of the AF entity, wherein the request message includes at least one of an identifier of the AF entity, information on a type of a network function (NF) entity associated with the discovery, a request for information for identifying the NF entity, or a value identifying at least one of a user equipment associated with the service, a protocol data unit (PDU) session, or a quality of service (QoS) flow; and transmitting, to a network exposure function (NEF) entity, a response message including the type of the NF entity and information for identifying a NF entity corresponding to the type of the NF entity, wherein the information for identifying the NF entity corresponding to the type of the NF entity is replaced by a mapping identifier which is mapped to the information for identifying the NF entity corresponding to the type of the NF entity.

20 Claims, 11 Drawing Sheets

(56)        References Cited

U.S. PATENT DOCUMENTS

| 2022/0345865 | A1 | 10/2022 | Munoz De La Torre Alonso et al. |
| 2023/0083529 | A1 | 3/2023 | Martinez De La Cruz et al. |
| 2023/0247537 | A1* | 8/2023 | Kweon ............... H04L 12/1403 370/329 |

OTHER PUBLICATIONS

International Search Report with Written Opinion dated Sep. 2, 2024; International Appln. No. PCT/KR2024/095781.

* cited by examiner

Message Format

104

1

METHOD AND APPARATUS FOR DISCOVERING USER PLANE FUNCTION UPF IN WIRELESS COMMUNICATION SYSTEM

CROSS-REFERENCE TO RELATED APPLICATION(S)

This application is based on and claims priority under 35 U.S.C. § 119(a) of a Korean patent application number 10-2023-0065193, filed on May 19, 2023, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for discovering, based on a user plane (UP), a serving user plane function (UPF).

2. Description of Related Art $5^{th}$ generation (5G) mobile communications technology defines a wide range of frequency bands to enable faster transmission speeds and new services, and can be implemented in the sub-6 gigahertz (GHz) ("Sub 6 GHz") bands, such as 3.5 gigahertz (3.5 GHz), as well as in the ultra-high frequency bands called millimeter wave ("Above 6 GHz"), such as 28 GHz and 39 GHz. In addition, for $6^{th}$ generation (6G) mobile communications technology, also referred to as Beyond 5G systems, implementations in the terahertz (THz) band (e.g., the 3 terahertz band at 95 GHz) are being considered to achieve 50 times faster transmission speeds and ultra-low latency of one-tenth of that of 5G mobile communications technology.

In the early stages of 5G mobile communications technology, beamforming and massive array multiple input/multiple output (Massive MIMO) to mitigate the path loss of radio waves in the ultra-high frequency band and increase the transmission distance of radio waves, with the goal of supporting services and meeting the performance requirements for enhanced Mobile BroadBand (eMBB), Ultra-Reliable Low-Latency Communications (URLLC), and massive Machine-Type Communications (mMTC), Support for various pneumatologies for efficient utilization of ultra-high frequency resources (such as multiple subcarrier spacing operations) and dynamic operations for slot formats, early access technologies to support multi-beam transmission and broadband, and the definition and operation of band-width parts (BWPs), standardization of new channel coding methods such as Low Density Parity Check (LDPC) coding for large data transfers and Polar Code for reliable transmission of control information; Layer 2 (L2) pre-processing; and Network Slicing, which provides dedicated networks for specific services.

Currently, discussions are underway to improve and enhance the initial 5G mobile communications technology in light of the services it was intended to support, such as Vehicle-to-Everything (V2X) to help autonomous vehicles make driving decisions based on their own location and status information transmitted by the vehicle and increase user convenience, Physical layer standardization is underway for technologies such as New Radio Unlicensed (NR-U), NR terminal low power consumption technology (e.g., User Equipment (UE) Power Saving), Non-Terrestrial Network (NTN), which is a direct terminal-to-satellite communication for coverage in areas where communication with terrestrial networks is not possible, and Positioning.

In addition, intelligent factories (Industrial Internet of Things, IIoT) to support new services through connectivity and convergence with other industries; Integrated Access and Backhaul (IAB) to provide nodes for network coverage area expansion by integrating wireless backhaul links and access links; and Mobility Enhancement technologies, including Conditional Handover and Dual Active Protocol Stack (DAPS) handover, Standardization is also underway in the area of air interface architecture/protocols for technologies such as 2-step Random Access Channel (RACH) for NR, which simplifies the random access process; 5G baseline architecture (e.g., Service based Architecture, Service based Interface) for the convergence of Network Functions Virtualization (NFV) and Software-Defined Networking (SDN) technologies; and system architecture/services for Mobile Edge Computing (MEC), where services are delivered based on the location of the terminal Once these 5G mobile communication systems are commercialized, an explosive growth of connected devices will be connected to the communication network, which is expected to require enhancement of the functions and performance of 5G mobile communication systems and integrated operation of connected devices. To this end, new research will be conducted on improving 5G performance and reducing complexity by utilizing eXtended Reality (XR), Artificial Intelligence (AI), and Machine Learning (ML) to efficiently support Augmented Reality (AR), Virtual Reality (VR), and Mixed Reality (MR), supporting AI services, supporting Metaverse services, and drone communication.

In addition, these advances in 5G mobile communications systems will be supported by new waveforms to ensure coverage in the terahertz band of 6G mobile communications technology, and multi-antenna transmission technologies such as Full Dimensional MIMO (FD-MIMO), Array Antenna, and Large Scale Antenna, Metamaterial-based lenses and antennas, high-dimensional spatial multiplexing techniques using Orbital Angular Momentum (OAM), and Reconfigurable Intelligent Surface (RIS) technologies to improve coverage of terahertz band signals, Full Duplex technology to improve frequency efficiency and system network of 6G mobile communication technology; AI-based communication technology that utilizes satellite and artificial intelligence (AI) from the design stage and realizes system optimization by embedding end-to-end AI support functions; and next-generation distributed computing technology that realizes complex services beyond the limits of terminal computing power by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for effectively providing a service in a wireless communication system.

Additional aspects will be set forth in part in the description which follows and, in part, will be apparent from the description, or may be learned by practice of the presented embodiments.

In accordance with an aspect of the disclosure, a method and an apparatus for effectively providing a service in a wireless communication system are provided.

A method performed by a serving user plane function (UPF) entity in a wireless communication system, the method comprising: receiving, from an application function (AF) entity, a request message for requesting a discovery on the serving UPF entity or a session management function (SMF) entity, for a subscription on a service of the AF entity, wherein the request message includes at least one of an identifier of the AF entity, information on a type of a network function (NF) entity associated with the discovery, a request for information for identifying the NF entity, or a value identifying at least one of a user equipment associated with the service, a protocol data unit (PDU) session, or a quality of service (QoS) flow; and transmitting, to a network exposure function (NEF) entity, a response message including the type of the NF entity and information for identifying a NF entity corresponding to the type of the NF entity, wherein the information for identifying the NF entity corresponding to the type of the NF entity is replaced by a mapping identifier which is mapped to the information for identifying the NF entity corresponding to the type of the NF entity.

A method performed by an AF entity in a wireless communication system, the method comprising: transmitting, to a UPF entity, a request message for requesting a discovery on the serving UPF entity or an SMF entity, for a subscription on a service of the AF entity, wherein the request message includes at least one of an identifier of the AF entity, information on a type of a NF entity associated with the discovery, a request for information for identifying the NF entity, or a value identifying at least one of a user equipment associated with the service, a PDU session, or a QoS flow; and receiving, from a NEF entity, a response message including the type of the NF entity and a mapping identifier which is mapped to information for identifying a NF entity corresponding to the type of the NF entity, wherein the information for identifying the NF entity corresponding to the type of the NF entity is replaced by the mapping identifier.

A UPF entity in a wireless communication system, the serving UPF entity comprising: a transceiver; and a controller coupled with the transceiver and configured to: receive, from an AF entity, a request message for requesting a discovery on the serving UPF entity or an SMF entity, for a subscription on a service of the AF entity, wherein the request message includes at least one of an identifier of the AF entity, information on a type of a NF entity associated with the discovery, a request for information for identifying the NF entity, or a value identifying at least one of a user equipment associated with the service, a PDU session, or a QoS flow, transmit, to a NEF entity, a response message including the type of the NF entity and information for identifying a NF entity corresponding to the type of the NF entity, wherein the information for identifying the NF entity corresponding to the type of the NF entity is replaced by a mapping identifier which is mapped to the information for identifying the NF entity corresponding to the type of the NF entity.

An AF entity in a wireless communication system, the AF entity comprising: a transceiver; and a controller coupled with the transceiver and configured to: transmit, to a UPF entity, a request message for requesting a discovery on the serving UPF entity or a SMF entity, for a subscription on a service of the AF entity, wherein the request message includes at least one of an identifier of the AF entity, information on a type of a NF entity associated with the discovery, a request for information for identifying the NF entity, or a value identifying at least one of a user equipment associated with the service, a PDU session or a QoS flow, receive, from the serving UPF entity, a response message including the type of the NF entity and information for identifying a NF entity corresponding to the type of the NF entity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
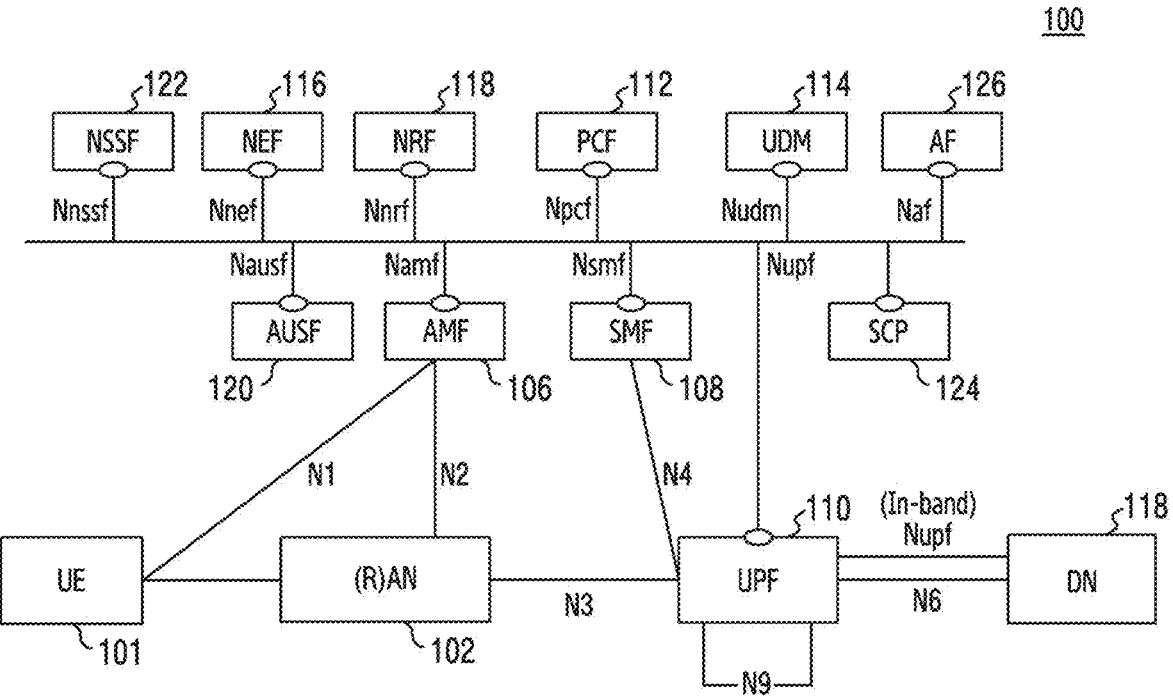
FIG. 1 illustrates a structure of a 5G network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the accompanying drawings, some components are exaggerated, omitted, or shown schematically. Also, the dimensions of each component are not intended to be entirely reflective of its actual size. In each drawing, identical or corresponding components are given the same reference numerals.

The advantages and features of the disclosure, and methods of achieving them, will become apparent upon reference to the embodiments described in detail with reference to the accompanying drawings. However, the disclosure is not limited to the embodiments disclosed herein, but may be embodied in many different forms, and these embodiments are provided merely to make the disclosure complete and to fully inform those of ordinary skill in the art to which the disclosure belongs of the scope of the disclosure, which is defined by the claims. Throughout the disclosure, like reference numerals refer to like components.

At this point, it will be understood that each block of the processing flowchart illustrations and combinations of the flowchart illustrations may be performed by computer program instructions. These computer program instructions may be loaded onto a processor of a general purpose computer, a special purpose computer, or other programmable data processing equipment, such that the instructions, when executed by the processor of the computer or other programmable data processing equipment, create means for performing the functions described in the flowchart block(s). The computer program instructions may be stored in computer-available or computer-readable memory that may direct the computer or other programmable data processing equipment to perform the functions in a particular manner, so that the instructions stored in the computer-available or computer-readable memory may produce an article of manufacture comprising the instructional means for performing the functions described in the flowchart block(s). The computer program instructions may also be carried on a computer or other programmable data processing equipment, such that a sequence of operational steps is performed on the computer or other programmable data processing equipment to create a computer-executable process, such that the instructions carrying the computer or other programmable data processing equipment provide steps for performing the functions described in the flowchart block(s).

Further, each block may represent a module, segment, or portion of code comprising one or more executable instructions for performing a specified logical function(s). It should also be noted that in some alternative execution examples, the functions mentioned in the blocks may occur out of sequence. For example, two blocks shown one after the other may in fact be performed substantially simultaneously, or the blocks may be performed in reverse order, depending on the functions they sometimes perform.

As used herein, the term "part" refers to software or a hardware component, such as a field programmable gate arrays (FPGA) or application specific integrated circuits (ASIC), that performs some function. However, "part" is not limited to software or hardware. The "~part" may be configured to be on an addressable storage medium or may be configured to reproduce one or more processors. Thus, in one example, "part" includes components, such as software components, object-oriented software components, class components, and task components, processes, functions, attributes, procedures, subroutines, segments of program code, drivers, firmware, microcode, circuits, data, databases, data structures, tables, arrays, and variables. The functionality provided within components and parts may be combined into fewer components and parts or further separated into additional components and parts. Furthermore, the components and parts may be implemented to play one or more central processing units (CPUs) within the device or secure multimedia card.

Hereinafter, a base station is an entity that performs resource allocation for a terminal, and may be at least one of a Node B, a base station (BS), an eNode B (eNB), a gNode B (gNB), a wireless access unit, a base station controller, or a node in a network. The terminal may include a user equipment (UE), a mobile station (MS), a cellular phone, a smartphone, a computer, or a multimedia system capable of performing communication functions. Embodiments of the disclosure may also be applied to other communication systems having a similar technical background or channel type as the embodiments described below. Furthermore, embodiments of the disclosure may be applied to other communication systems with some modifications that do not substantially depart from the scope of the disclosure as determined by a skilled person having technical knowledge.

As used in the following description, terms for identifying access nodes, terms for referring to network entities or network functions (NFs), terms for referring to messages, terms for referring to interfaces between network entities, terms for referring to various identifying information, and the like are exemplified for ease of description. Accordingly, the disclosure is not limited to the terms described herein and other terms may be used to refer to objects having equivalent technical meaning.

For the purposes of the following description, some of the terms and designations defined in the 3rd generation partnership project long term evolution (3GPP) specifications may be used. However, this disclosure is not limited by such terms and designations and may be equally applicable to systems conforming to other standards.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS)

chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro- cessor unit (MPU), a system on chip (SoC), an IC, or the like.

FIG. 1 illustrates a structure of a 5G network according to an embodiment of the disclosure.

Referring to FIG. 1, descriptions of network entities or network nodes constituting a $5^{th}$ generation (5G) network 100 are as follows.

A (radio) access network ((R)AN) 102 is an entity that performs radio resource allocation of a terminal 104 and may be an at least one of an eNode B, a node B, a base station (BS), a next generation RAN (NG-RAN), a 5G-AN, a radio access unit, a base station controller, or a node on a network.

The terminal 104 may include a UE, a next generation UE (NG UE), a mobile station (MS), a cellular phone, a smart- phone, a computer, or a multimedia system capable of performing a communication function. In addition, herein- after, although the embodiment of the disclosure is described by taking the 5G network as an example, the embodiment of the disclosure may be applied to other communication systems having a similar technical background. Further- more, the embodiments of the disclosure may be applied to other communication systems through some modifications within a range that does not significantly depart from the scope of the disclosure as determined by those having skilled technical knowledge.

The wireless communication system defines a next gen- eration (gen) core (NG core) or a 5G core network (5GC), which is a new core network as it evolves from a $4^{th}$ generation (4G) system to a 5G system. The new core network virtualized all the existing network entities (NEs) and made it into an NF. According to an embodiment of the disclosure, an NF may mean a network entity, a network component, and a network resource.

According to an embodiment of the disclosure, the 5GC may include NFs illustrated in FIG. 1. The 5GC is not limited to an example of FIG. 1 and may include a larger number of NFs or a smaller number of NFs than that illustrated in FIG. 1.

An access and mobility management function (AMF) 106 may be a network function for managing the access and mobility of the terminal 104. For example, the AMF 106 may perform a network function such as registration, con- nection, reachability, mobility management, access identifi- cation, authentication, and mobility event generation.

A session management function (SMF) 108 may be a network function for managing a packet data network (PDN) connection provided to the terminal 104. The PDN connec- tion may be referred to as a protocol data unit (PDU) session. For example, the SMF 108 may perform a session manage- ment function through session establishment, modification, or releasing, and maintaining of a tunnel between a user plane function (UPF) 110 and the RAN 102, a function of allocating and managing an Internet protocol (IP) address of the terminal 104, and a network function such as selection and control of the user plane, traffic processing control in the UPF 110, and a charge data collection control.

A policy control function (PCF) 112 may be a network function that applies a service policy of a mobile commu- nication operator to the terminal 104, a charging policy, and a policy for a PDU session.

A unified data management (UDM) 114 may be a network function for storing information on a subscriber. For example, the UDM 114 may perform functions such as generating authentication information for 3GPP security, user identity (ID) processing, managing a list of NFs sup- porting the terminal 104, and managing subscription infor- mation.

A network exposure function (NEF) 116 may be a func- tion of providing information on the terminal 104 to a server outside the 5G network 100. In addition, the NEF 116 may provide a function of providing information used for pro- viding a service to the 5G network 100 and storing the information in a unified data repository (UDR).

A user plane function (UPF) 110 may be a function that serves as a gateway for transferring user data to a data network (DN) 128. More specifically, the UPF 110 may perform a role of processing data so that data transmitted by the terminal 104 can be transferred to an external network, or data introduced from the external network can be trans- ferred to the terminal 104. For example, the UPF 110 may perform a network function such as acting as an anchor between radio access technologies (RATs), packet routing and forwarding, packet inspection, application of user plane policy, creating a traffic usage report, or buffering.

A network repository function (NRF) 118 may perform a function of discovering the NF.

An authentication server function (AUSF) 120 may per- form terminal authentication in a 3GPP access network and a non-3GPP access network.

A network slice selection function (NSSF) 122 may perform a function of selecting a network slice instance provided to the terminal 104.

A service communication proxy (SCP) 124 is a network function enabling dynamic scaling and management of communication and services in the 5G network.

The DN 128 may be a data network in which the terminal 104 transmits and receives data in order to use a service of a network provider or a $3^{rd}$ party service.

In an embodiment of the disclosure, an equipment (i.e., application function (AF) 126) located in the DN 128 may use an N6 interface (user plane or in-band) to exchange a control message with the UPF 110.

According to an embodiment of the disclosure, provided is a method for discovering a serving UPF 110 for process- ing a specific terminal 104, a specific PDU session, or a specific IP (quality of service (QoS)) flow through an interface using a user plane (UP) for a network device or a network function located inside or outside a 5G core net- work to use a service provided by the UPF 110.

Figure 2:
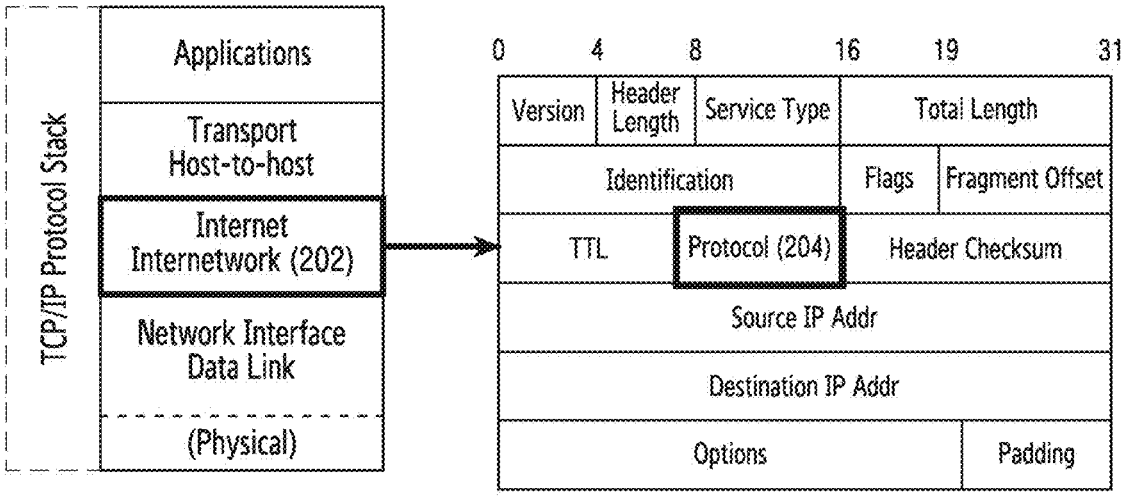
FIG. 2 illustrates a transmission control protocol (TCP)/Internet protocol (IP) protocol stack and an IP layer (IPv4)-based datagram header (packet header) according to an embodiment of the disclosure.

FIG. 2 illustrates a transmission control protocol (TCP)/IP protocol stack and an IP layer (IPv4)-based datagram header (packet header) according to an embodiment of the disclo- sure.

According to an embodiment of the disclosure, a UPF 110 and an AF 126 are a router equipment and a server equip- ment, respectively, and may communication through an N6 interface by using a TCP/IP protocol stack to transmit user data. The UPF 110 is a router equipment, and thus basically includes up to an IP layer 202. Accordingly, an in-band protocol for transferring a control message between the UPF 110 and the AF 126 may exist in the IP layer 202.

The IP datagram header may include a protocol field 204. Based on the IPv6 standard, a next header field may perform a function of a protocol field 204. In the disclosure, a description is made based on an IPv4 protocol, but is also applicable to the IPv6 protocol in the same manner. The protocol field 204 (e.g., IPv6-based next header field) is an 8-bit field, and defines a higher-layer protocol using the IP layer service. Various types of higher-layer protocols such as a TCP, a user datagram protocol (UDP), an Internet control message protocol (ICMP), and an Internet group management protocol (IGMP) may use the IP layer.

In an embodiment of the disclosure, as the in-band protocol, a description is made with reference to the UPF control message protocol (UCMP). However, the disclosure is not limited thereto, and other in-band protocols may be used.

The UCMP may receive allocation of one of protocol field 204 that are not being used. In the disclosure, it is described that number 144 is allocated. However, the disclosure is not limited thereto, and various new protocol names and IP protocol numbers may be used while not being limited to the embodiment of the disclosure.

Figure 3:
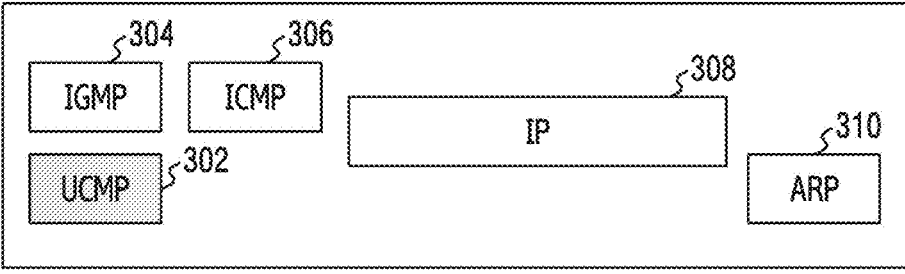
FIG. 3 illustrates an IP layer including a user plane function (UPF) control message protocol (UCMP) according to an embodiment of the disclosure.

FIG. 3 illustrates an IP layer including a UCMP according to an embodiment of the disclosure.

According to an embodiment of the disclosure, the UCMP 302 may be included in the IP layer 308, like the related art IGMP 304, ICMP 306, and address resolution protocol (ARP) 310. In addition, the UCMP 302 may exist on the IP layer 308. The UCMP 302 illustrated in FIG. 3 is illustrated with reference to the IPv4, the disclosure is not limited thereto, and the UCMP 302 is also applicable to the IPv6 in the same manner.

Figure 4:
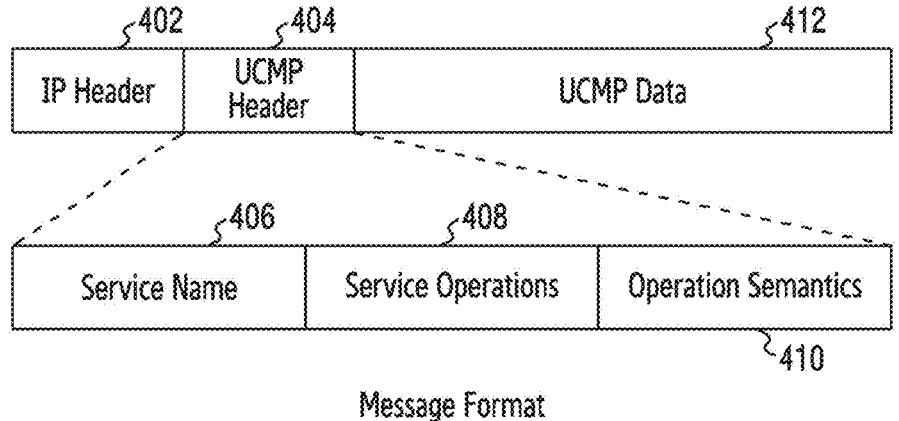
FIG. 4 illustrates an IP datagram including a UCMP protocol message and a UCMP protocol message format according to an embodiment of the disclosure.

FIG. 4 illustrates an IP datagram including a UCMP protocol message and a UCMP protocol message format according to an embodiment of the disclosure.

As illustrated above, as a value of a protocol field of an IP header 402, a value of 144 indicating the UCMP is input. A UCMP header 404 may include a UPF service name 406, a service operation 408, and an operation semantic value 410. UCMP data 412 may include parameter values required for the UPF service. The disclosure is not limited to the example above. The a protocol field described herein with respect to FIG. 2 may be the a protocol field described herein with respect to FIG. 4

Figure 5:
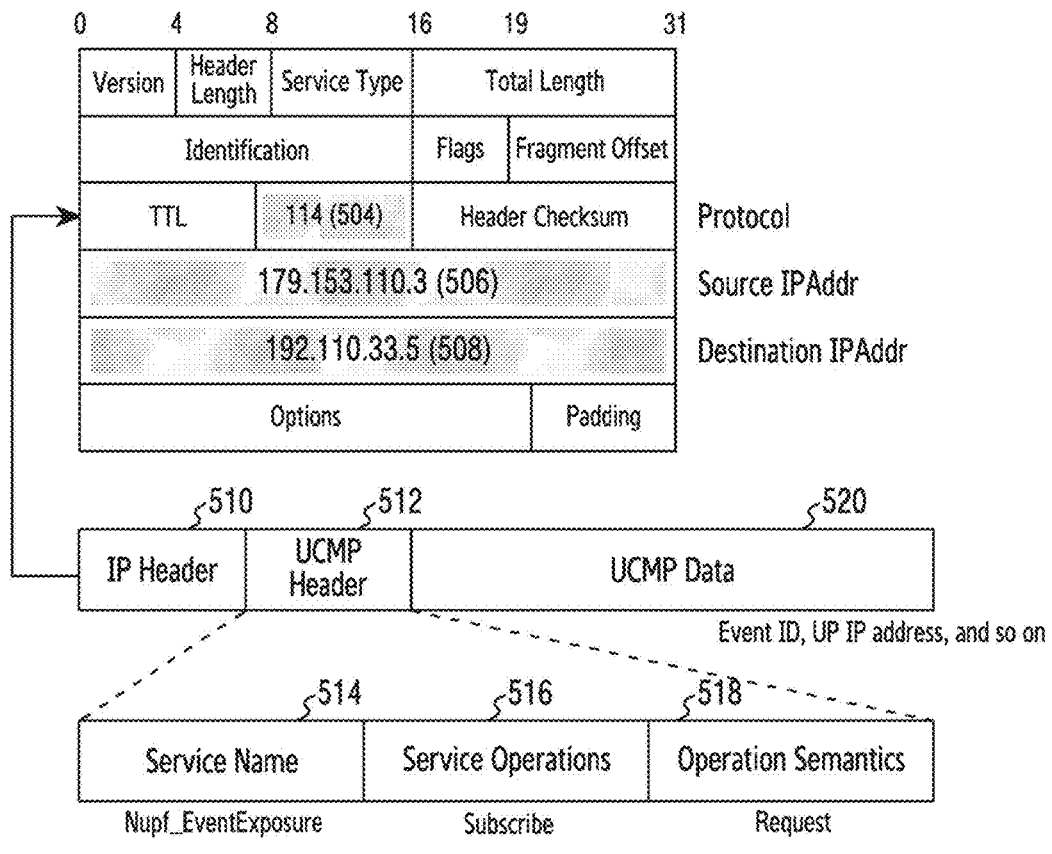
FIG. 5 illustrates an example of an operation of a UCMP according to an embodiment of the disclosure.
Figure 5:
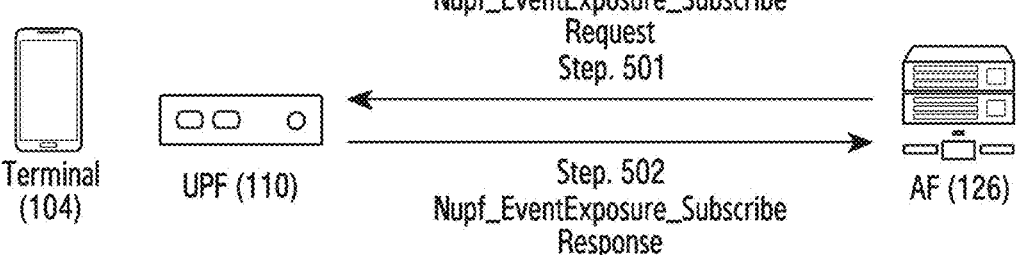

FIG. 5 illustrates an example of an operation of a UCMP according to an embodiment of the disclosure.

Referring to FIG. 5, an AF 126 corresponding to an external server may request UPF service subscription from a UPF 110 to use a specific service of the UPF110. To this end, the AF 126 may generate a UCMP message, include the generated UCMP message an IP datagram, and transmit the same to the UPF110. As described above, a value of "144" may be input to a protocol field 504 of the IP header 510 to indicate that the corresponding IP datagram includes the UCMP message. A value of "179.153.110.3" corresponding to an IP address of the AF 126 is input to a source IP address field 506. A value of "192.110.33.5" corresponding to an IP address of the terminal 104 may be input to a destination address field 508. The IP datagram described herein with respect to FIG. 2 may be the IP datagram described herein with respect to FIG. 5. The UCMP protocol message described herein with respect to FIG. 5 may be the UCMP protocol message described herein with respect to FIG. 4.

According to an embodiment of the disclosure, the following values are input to the UCMP header 512. A value of "Nupf_EventExposure" corresponding to a UPF service name may be input to a service name field 514. This indicates a name of a service to be requested to the UPF 110 by the AF 126.

According to an embodiment of the disclosure, a value of "Subscribe" corresponding to service subscription is input to a service operations field 516. This indicates a service operation requested to the UPF 110 by the AF 126.

According to an embodiment, a value of "Request" corresponding to a service request is input to an operation semantics field 518. This indicates definition to an operation indicating that a request is made from the AF 126 to the UPF 110 for the service.

According to an embodiment of the disclosure, a UCMP data field 520 includes parameter values required for a corresponding service subscription request. A parameter value may be various values such as an event ID, terminal IP address, a generic public subscription identifier (GPSI), a data network name (DNN), and single network slice selection assistance information (S-NSSAI). The disclosure is not limited to the example above.

According to an embodiment of the disclosure, the corresponding IP diagram is transmitted to a PDU session anchor (PSA) UPF corresponding to a home router of the terminal 104 (step 501). The UPF 110 may process the IP header 510 the IP datagram. In this case, the value of the protocol field 504 is "144", and thus it may be recognized that the IP datagram includes a UCMP message. That is, the UPF 110 having received the corresponding IP datagram may identify that the corresponding IP datagram does not include user data transmitted to the terminal 104 and includes the UCMP message for requesting the service from the UPF 110 serving the corresponding terminal 104. The UPF 110 may read the UCMP service and process the requested service subscription. The UPF 110 may disregard the corresponding IP datagram without transmitting the same to the terminal 104.

Thereafter, the UPF 110 may transmit a result of the requested service subscription processing to the AF 126 (step 502). To this end, the UPF 110 generates the UCMP message. The following values are input to the UCMP header. A value of "Nupf_EventExposure" corresponding to a UPF service name is input to a service name field 514. A value of "Subscribe" value corresponding to service subscription is input to a service operations field 516. A value of "Response" corresponding to a response to a service request is input to an operation semantics field 518. Parameter values required for the corresponding service subscription request response may be included in a UCMP data field 520.

The IP datagram and UCMP protocol message illustrated in FIG. 5 are provided as an example, the disclosure is not limited thereto, and various modifications can be made according to a system configuration, a UPF service requested by the AF 126, etc.

Figure 6:
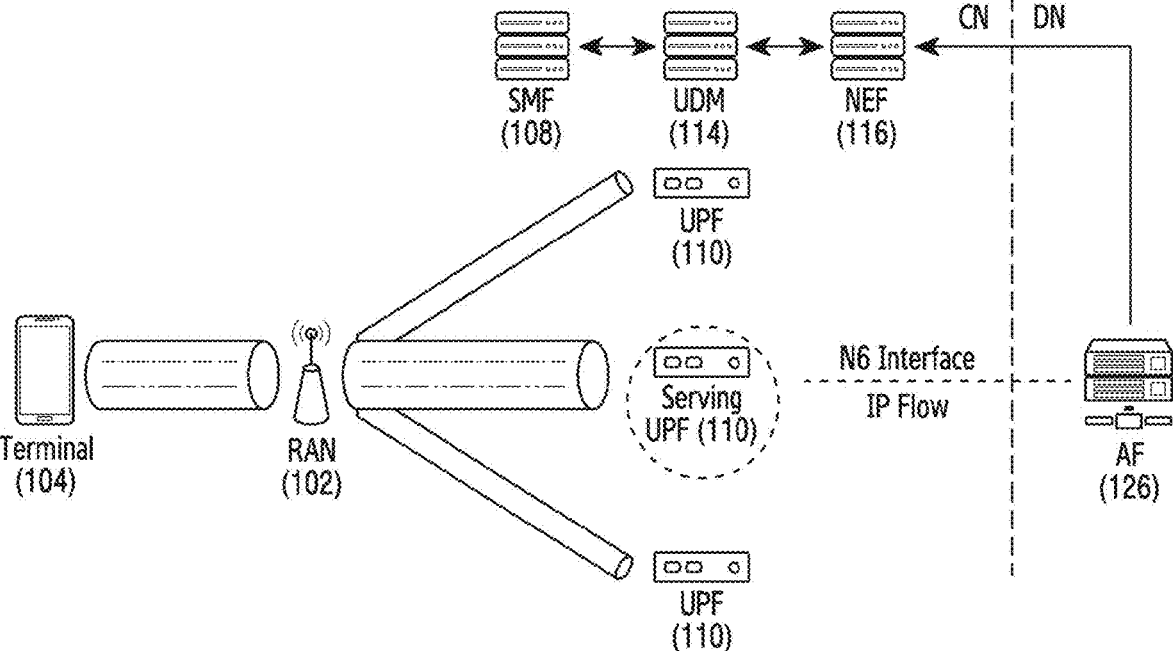
FIG. 6 illustrates a method for discovering a serving UPF according to an embodiment of the disclosure.

FIG. 6 illustrates a method for discovering a serving UPF 110 according to an embodiment of the disclosure.

FIG. 6 illustrates an environment to which the disclosure is applied. A terminal 104 generates three PDU sessions and the PDCU sessions are handled by different UPFs 110, respectively. In this case, the AF 126 may desires to subscribe a UPF event exposure service with a UPF 110 handling an IP flow serviced by the AF 126, i.e., a serving UPF 110.

In the technology of the related art, a control message is transmitted based on a control plane (CP), the AF 126 transmits a service subscription request message to an NEF 116. In this case, the AF 126 may transmit information such as a terminal IP (e.g., GPSI), a terminal IP address, and S-NSSAI, as a parameter for a service subscription request message. The NEF 116 cannot discover the serving UPF 110 through the information transmitted by the AF 126, and thus the NEF 116 may transmit the service subscription request message to the UDM 114. The UDM 114 may discover an SMF 108 handling the serving UPF 110 by using the terminal IP or the terminal IP address, and the UDM 114 may provide the SMF 108 handling the serving UPF 110 with the service subscription request message.

According to the technology of the related art, the service subscription request message of the AF 126 is finally transmitted to the serving UPF 110 through the NEF 116, the UDM 114, and the SMF 108. When the service subscription request message of the AF 126 is transferred to the serving UPF 110 through the NEF 116, the UDM 114, and the SMF 108, the efficiency of the network use is reduced, the overhead is increased, and the latency is increased. Accordingly, the disclosure proposes a method for discovering the serving UPF 110 by using an N6 interface between the AF 126 and the UPF 110.

Figure 7:
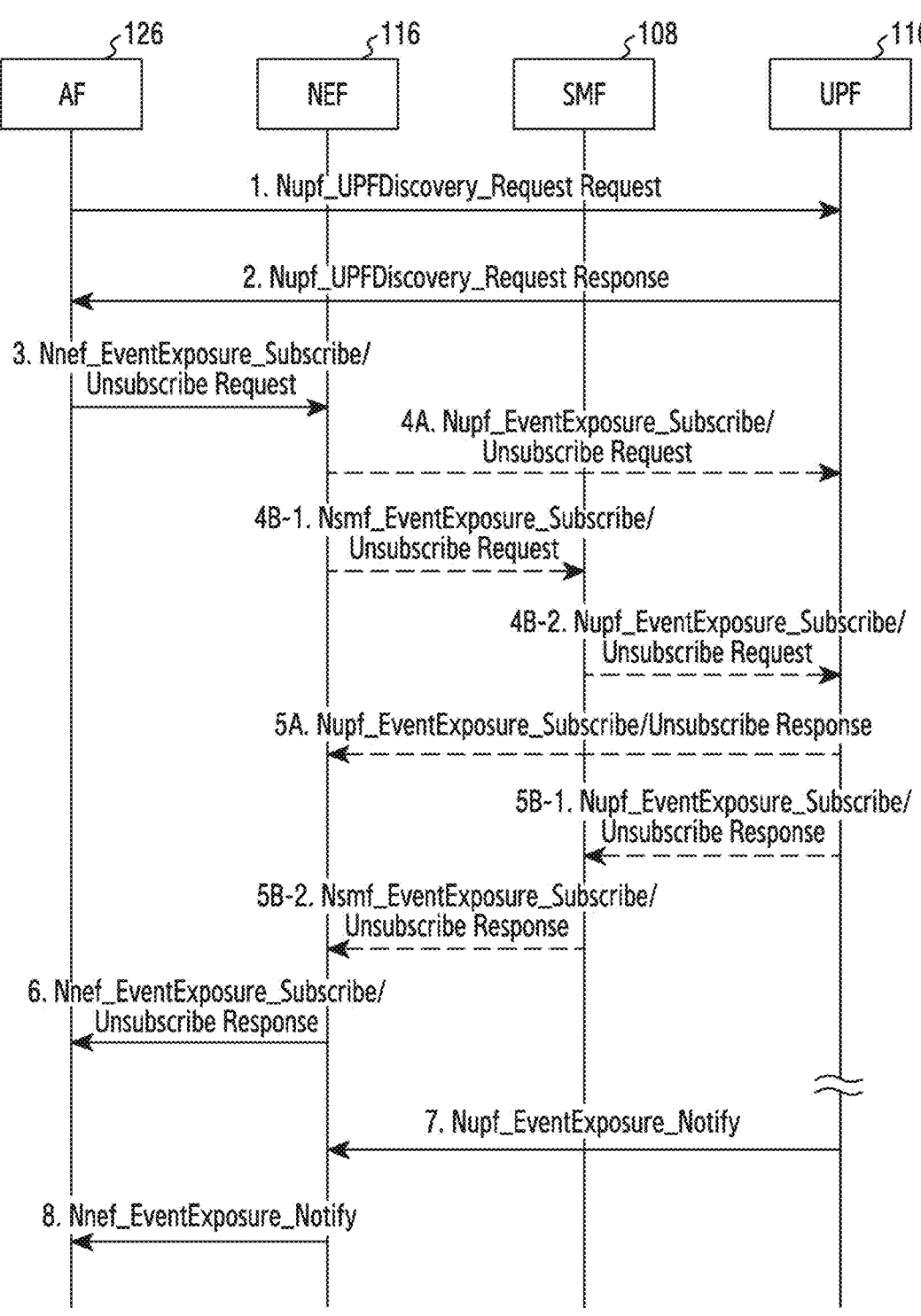
FIG. 7 illustrates a signaling procedure through serving UPF discovery according to an embodiment of the disclosure.

FIG. 7 illustrates a signaling procedure through serving UPF 110 discovery according to an embodiment of the disclosure.

According to an embodiment of the disclosure, when a UPF event exposure service subscription request is made, a service which enables direct subscription to the UPF 110 and a service which enables indirect subscription through the SMF 108 are distinguished from each other. The service provided by the UPF 110 may be identified through an event ID. In addition, when the UPF service direct subscription using the in-band is possible in the future, the AF 126 may request the service subscription from the UPF 110 by using the in-band.

When there is a service that the AF 126 desires to subscribe to and the corresponding service subscription request is possible only through the control plane, a serving UPF 110 or a serving SMF 108 may need to be discovered according to whether the service can be directly subscribed. Specifically, when the service that the AF 126 desires to subscribe to is the service that can be directly subscribed, the serving UPF 110 may need to be discovered, and when the service that the AF 126 desires to subscribe to is the service which cannot be directly subscribed, the serving SMF 108 may need to be discovered.

In stage 1, the AF 126 may transmit an Nupf_UPFDiscovery_Request request message to the serving UPF 110 by using an N6 in-band protocol to discover the serving UPF 110 or the serving SMF 108. According to an embodiment of the disclosure, the N6 in-band protocol may include the above-described UCMP protocol. Alternatively, a pre-promised specific tag through a service level agreement (SLA) between a network business operator and a 3$^{rd}$ party service provider (AF) may be included in a user packet header. The AF 126 may transmit a control message such as the Nupf_UPFDiscovery_Request request through a user plane by using the N6 in-band protocol.

According to an embodiment of the disclosure, the Nupf_UPFDiscovery_Request request message may include at least one of an AF ID corresponding to an ID of the AF 126 itself, an NF type desired to be requested (i.e., UPF 110 or SMF 108, NF which can be the NF type, and not being limited to the example above), a request result to be obtained through the Nupf_UPFDiscovery_Request request (i.e., values which can address or identify the NF for discovering an IP address, a fully qualified domain name (FQDN), or an NF ID, and not being limited to the values enumerated herein), and values which can specify the terminal 104, the PDU session, or the IP (QoS) flow (e.g., values such as the GPSI, terminal IPv4 address(es), terminal IPv6 prefix(es), terminal medium access control (MAC) address(es), external group identifier, S-NSSAI, DNN, or indication, and not being limited to the values enumerated herein). The name of the message used to discover the serving UPF 110 or the serving SMF 108 is not limited to the example above, and may be changed to another name.

According to an embodiment, the AF 126 may determine, based on whether the service that the AF 126 desires to subscribe to allows direct subscription, an NF (for example, a serving UPF 110 or a serving SMF 108), the identification information of which is to be requested, through the Nupf_UPFDiscovery_Request request message, and may determine, based thereon, information or a value to be included in the Nupf_UPFDiscovery_Request request message.

In stage 2, the serving UPF 110 having received the Nupf_UPFDiscovery_Request request message or the user packet including the specific tag transmits, to the terminal 104, an Nupf_UPFDiscovery_Request response message by including the NF type and one or more of the IP address, the FQDN, or the NF ID of the requested NF, according to the NF type and the desired request result.

For example, the serving UPF 110 may determine, based on whether the AF 126 has requested information on the serving UPF 110 and whether the AF 126 has requested information on the serving SMF 108, the NF type and one or more of the IP address, the FQDN, or the NF ID of the requested NF, and transmit the determined data to the terminal 104 through the Nupf_UPFDiscovery_Request response message.

In stage 3, the AF 126 transmits an Nnef_EventExposure_Subscribe/Unsubscribe request to the NEF 116. In this case, the Nnef_EventExposure_Subscribe/Unsubscribe request includes the NF type and the corresponding NF addressing/identification information received in stages 1 and 2.

For example, the AF 126 may transmit, to the NEF 116, the Nnef_EventExposure_Subscribe/Unsubscribe request including the NF type corresponding to the serving UPF 110 and the corresponding NF addressing/identification information or the Nnef_EventExposure_Subscribe/Unsubscribe request including the NF type corresponding to the serving SMF 108 and the corresponding NF addressing/identification information.

In addition, according to an embodiment of the disclosure, instead of going through the NEF 116 in stage 3, the Nnef_EventExposure_Subscribe/Unsubscribe request may be directly transmitted to the SMF 108 or the UPF 110.

When the service that the AF 126 desires to subscribe to is the service which can be directly subscribed through the UPF 110 and the NF type of the message received by the NEF 116 in stage 3 is thus the UPF 110, the NEF 116 performs, through the Nnef_EventExposure_Subscribe/Unsubscribe request/response, service subscription requested by the AF 126 in stages 4A and 5A.

According to an embodiment of the disclosure, in stages 4A and 5A, the NEF 116 may transmit or receive the Nnef_EventExposure_Subscribe/Unsubscribe request/response to or from the UPF 110.

In stages 4B-1/2 and 5B-1/2, when the service that the AF 126 desires to subscribe to is the service which cannot be directly subscribed through the UPF 110 and the NF type of the message received by the NEF 116 in stage 3 is thus the SMF 108, the NEF 116 transmits the Nnef_EventExposure_Subscribe/Unsubscribe request/response message to the SMF 108 to perform, through the SMF 108, service subscription indirectly requested by the AF 126.

According to an embodiment of the disclosure, in stages 4B-1/2 and 5B-1/2, the NEF 116 may transmit or receive the Nnef_EventExposure_Subscribe/Unsubscribe request/response to or from the UPF 110 through the SMF 108.

In stage 6, the NEF 116 may transmit a UPF service subscription result to the AF 126.

In stages 7 and 8, when an event of the service requested by the AF 126 occurs in the UPF 110, a notification thereof may be transmitted to the AF 126 through the NEF 116.

Figure 8:
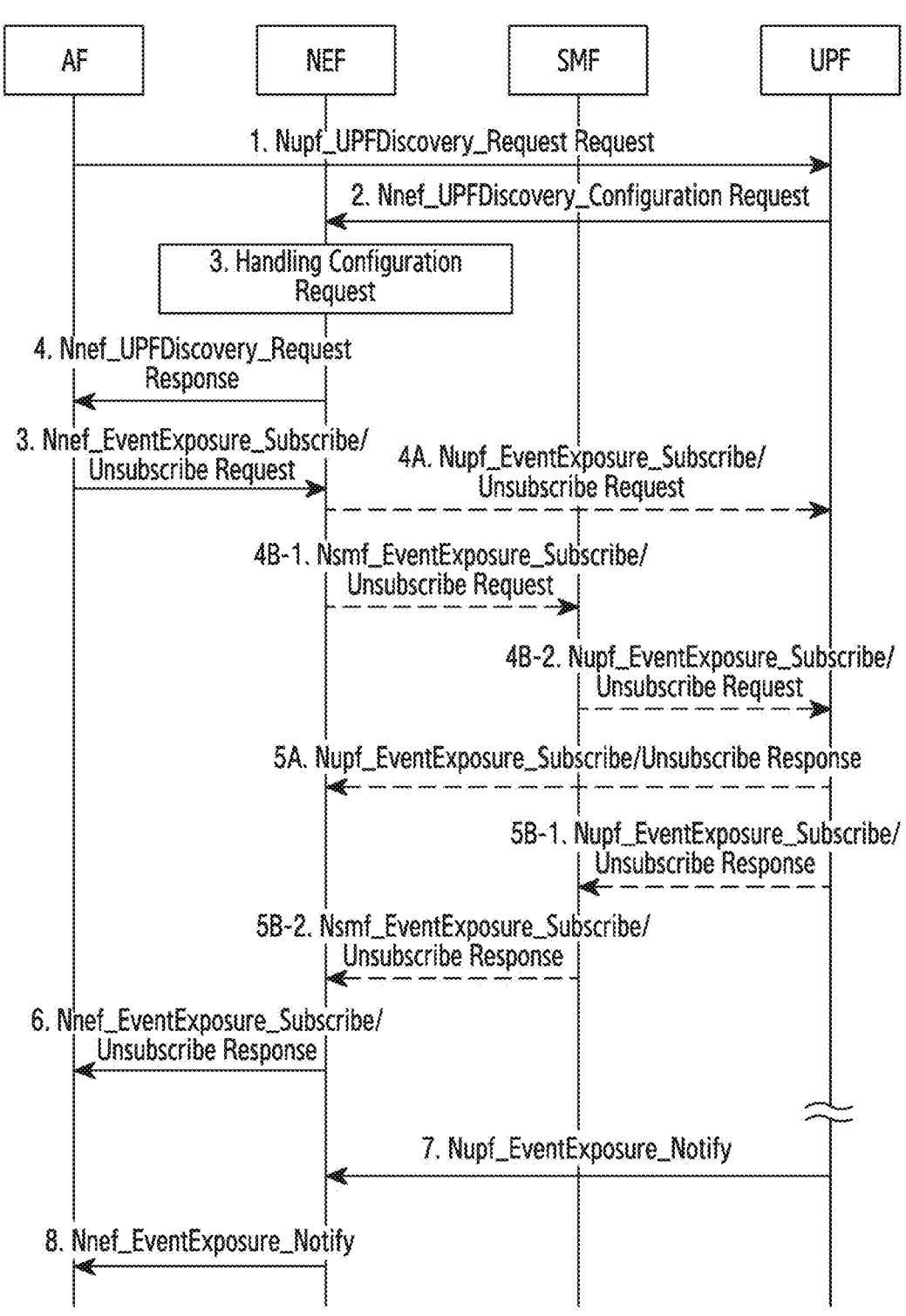
FIG. 8 illustrates a signaling procedure for serving UPF 110 discovery according to an embodiment of the disclosure.

FIG. 8 illustrates a signaling procedure for serving UPF 110 discovery according to an embodiment of the disclosure.

According to an embodiment of the disclosure, when a UPF 110 event exposure service subscription request is made, a service which enables direct subscription to the UPF 110 and a service which enables indirect subscription through the SMF 108 may be distinguished from each other. The service provided by the UPF 110 may be identified through an event ID. In addition, when the UPF 110 service direct subscription using the in-band is possible in the future, the AF 126 may request the service subscription from the UPF 110 by using the in-band.

When there is a service that the AF 126 is to subscribe to and the corresponding service subscription request is possible only through the control plane, a serving UPF 110 or a serving SMF 108 may need to be discovered according to whether the service can be directly subscribed. Specifically, when the service that the AF 126 is to subscribe to is the service that can be directly subscribed, the serving UPF 110 may need to be discovered, and when the service that the AF 126 is to subscribe to is the service which cannot be directly subscribed, the serving SMF 108 may need to be discovered.

In stage 1, the AF 126 may transmit an Nupf_UPFDiscovery_Request request message to the serving UPF 110 by using an N6 in-band protocol to discover the serving UPF 110 or the serving SMF 108. According to an embodiment of the disclosure, the N6 in-band protocol may include the above-described UCMP protocol. Alternatively, a pre-promised specific tag through a service level agreement (SLA) between a network business operator and a $3^{rd}$ party service provider (AF 126) may be included in a user packet header. The AF 126 may transmit a control message such as the Nupf_UPFDiscovery_Request request through a user plane by using the N6 in-band protocol.

According to an embodiment of the disclosure, the Nupf_UPFDiscovery_Request request message may include at least one of an AF 126 ID corresponding to an ID of the AF 126 itself, an NF type which is to be requested (i.e., UPF 110 or SMF 108, NF which can be the NF type, and not being limited to the example above), a request result to be obtained through the Nupf_UPFDiscovery_Request request (i.e., values which can address or identify the NF for discovering an IP address, a fully qualified domain name (FQDN), or an NF ID, and not being limited to the values enumerated herein), and values which can specify the terminal, the PDU session, or the IP (QoS) flow (e.g., values such as the GPSI, UE IPv4 address(es), UE IPv6 prefix(es), UE MAC address(es), external group identifier, S-NSSAI, DNN, or indication, and not being limited to the values enumerated herein). The name of the message used to discover the serving UPF 110 or the serving SMF 108 is not limited to the example above, and may be changed to another name.

According to an embodiment, the AF 126 may determine, based on whether the service that the AF 126 is to subscribe to allows direct subscription, an NF (for example, a serving UPF 110 or a serving SMF 108), the identification information of which is to be requested, through the Nupf_UPF-Discovery_Request request message, and may determine, based thereon, information or a value to be included in the Nupf_UPFDiscovery_Request request message.

In stage 2, the serving UPF 110 having received the Nupf_UPFDiscovery_Request request message or a user packet including a specific tag transmits, to the NEF 116, an Nnef_UPFDiscovery_Configuration request message by including the NF type and one or more of the IP address, the FQDN, or the NF ID of the requested NF, according to the NF type and the desired request result.

For example, the serving UPF 110 may determine, based on whether the AF 126 has requested information on the serving UPF 110 and whether the AF 126 has requested information on the serving SMF 108, the NF type and one or more of the IP address, the FQDN, or the NF ID of the requested NF, and transmit the determined data to the NEF 116 through the Nnef_UPFDiscovery_Configuration request message.

In stage 3, the NEF 116 may process a configuration request of the serving UPF 110. When the AF 126 requests an ID of the NF such as an SMF 108 or a UPF 110, such ID of the NF may be information which is used within a network business operator only and cannot be exposed. To prevent exposure of such information, instead of transmitting the ID of the NF (e.g., UPF 110, SMF 108, etc.) to the AF 126, the NEF 116 may allocate a mapping ID for replacing each ID and transmit the mapping ID to the AF 126. A relationship between the NF ID and the mapping ID may be stored in configuration data in the form of a mapping table within the NEF 116.

In stage 4, the NEF 116 may transmit an Nnef_UPFDiscovery_Request Response message to the AF 126 by including the NF type and one or more of the IP address, the FQDN, or the NF ID of the requested NF, according to information requested by the AF 126, i.e., the NF type and the desired request result.

In a case where the information requested by the AF 126 is the NF ID, the mapping ID of the corresponding NF ID, allocated by the NEF 116 in stage 3, may be included instead of the NF ID and transmitted. In addition, according to another embodiment, also in a case where the FQDN or the IP address of the corresponding NF cannot be transmitted, the mapping ID of the corresponding NF may be included and transmitted, instead of such information.

In stage 3, the AF 126 transmits an Nnef_EventExposure_Subscribe/Unsubscribe request to the NEF 116. In this case, the Nnef_EventExposure_Subscribe/Unsubscribe request includes the NF type and the corresponding NF addressing/identification information received in stages 1 and 2.

For example, the AF 126 may transmit, to the NEF 116, the Nnef_EventExposure_Subscribe/Unsubscribe request including the NF type corresponding to the serving UPF 110 and the corresponding NF addressing/mapping identification information or the Nnef_EventExposure_Subscribe/Unsubscribe request including the NF type corresponding to the serving SMF 108 and the corresponding NF addressing/mapping identification information.

In addition, according to an embodiment of the disclosure, instead of going through the NEF 116 in stage 3, the Nnef_EventExposure_Subscribe/Unsubscribe request may be directly transmitted to the SMF 108 or the UPF 110.

The NEF 116 may change the mapping ID included in the message to the FQDN or the ID address of the corresponding NF or the NF ID.

When the service that the AF 126 is to subscribe to is the service which can be directly subscribed through the UPF 110 and the NF type of the message received by the NEF 116 in stage 3 is thus the UPF 110, the NEF 116 performs, through the Nupf_EventExposure_Subscribe/Unsubscribe request/response, service subscription requested by the AF 126 in stages 4A and 5A.

According to an embodiment of the disclosure, in stages 4A and 5A, the NEF 116 may transmit or receive the Nupf_EventExposure_Subscribe/Unsubscribe request/response to or from the UPF 110.

In stages 4B-1 and 2 and 5B-1 and 2, when the service that the AF 126 is to subscribe to is the service which cannot be directly subscribed through the UPF 110 and the NF type of the message received by the NEF 116 in stage 3 is thus the SMF 108, the NEF 116 transmits the Nsmf_EventExposure_Subscribe/Unsubscribe request/response message to the SMF 108 to indirectly perform, through the SMF 108, service subscription requested by the AF 126.

According to an embodiment of the disclosure, in stages 4B-1/2 and 5B-1/2, the NEF 116 may transmit or receive the Nupf_EventExposure_Subscribe/Unsubscribe request/response to or from the UPF 110 through the SMF 108.

In stage 6, the NEF 116 may transmit a UPF 110 service subscription result to the AF 126.

In stages 7 and 8, when an event of the service requested by the AF 126 occurs in the UPF 110, a notification thereof may be transmitted to the AF 126 through the NEF 116.

Figure 9:
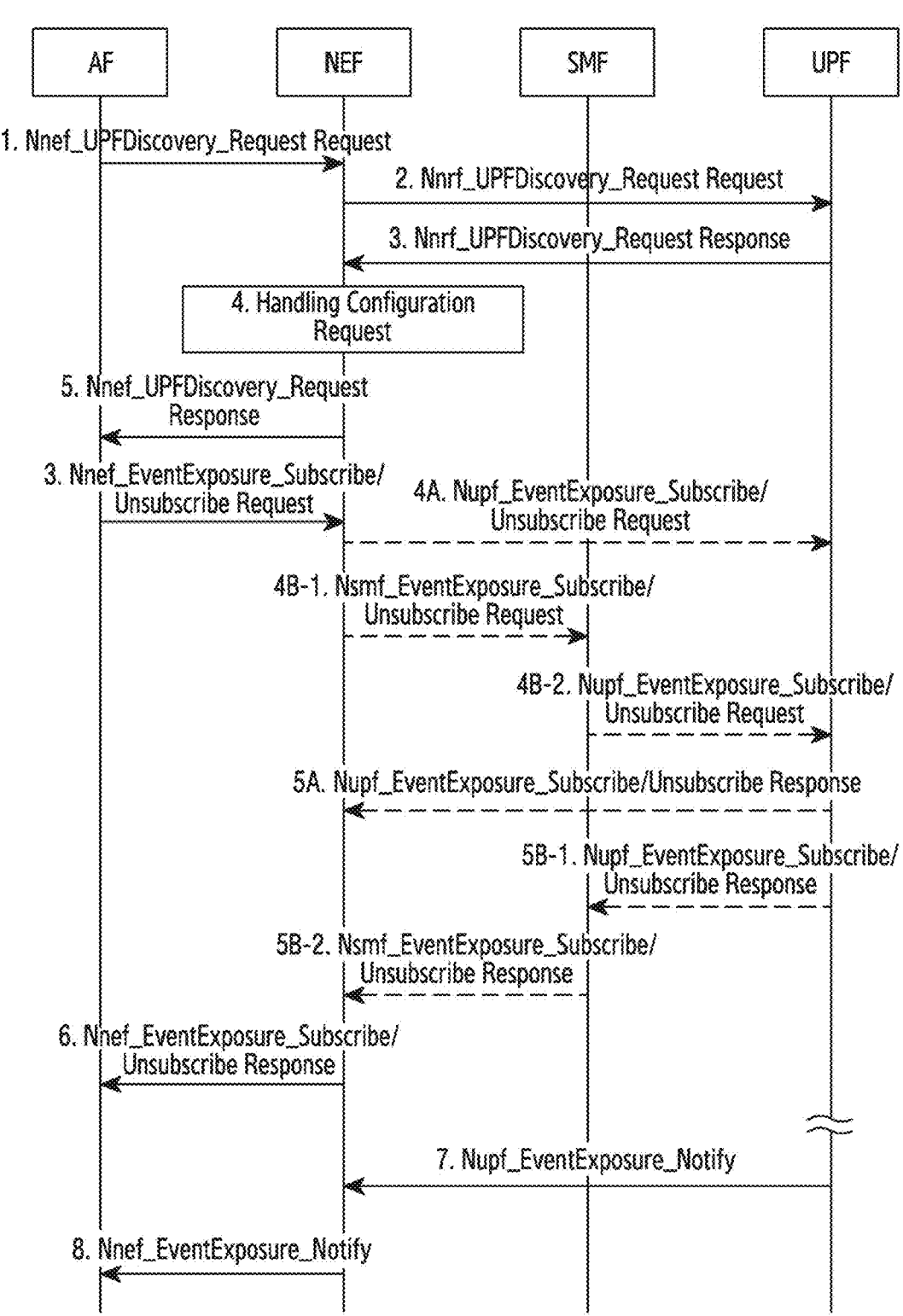
FIG. 9 illustrates a signaling procedure for serving UPF 110 discovery based on a control plane (CP) according to an embodiment of the disclosure.

FIG. 9 illustrates a signaling procedure for serving UPF 110 discovery based on a control plane (CP) according to an embodiment of the disclosure.

According to an embodiment of the disclosure, when a UPF 110 event exposure service subscription request is made, a service which enables direct subscription to the UPF 110 and a service which enables indirect subscription through the SMF 108 may be distinguished from each other. The service provided by the UPF 110 may be identified through an event ID. In addition, when the UPF 110 service direct subscription using the in-band is possible in the future, the AF 126 may request the service subscription from the UPF 110 by using the in-band.

When there is a service that the AF 126 is to subscribe to and the corresponding service subscription request is possible only through the control plane, a serving UPF 110 or a serving SMF 108 may need to be discovered according to whether the service can be directly subscribed. Specifically, when the service that the AF 126 is to subscribe to is the service that can be directly subscribed, the serving UPF 110 may need to be discovered, and when the service that the AF 126 is to subscribe to is the service which cannot be directly subscribed, the serving SMF 108 may need to be discovered.

In stage 1, the AF 126 may transmit an Nnef_UPFDiscovery_Request request message to the NEF 116 by using a CP to discover the serving UPF 110 or the serving SMF 108.

According to an embodiment of the disclosure, the Nnef_UPFDiscovery_Request request message may include at least one of an AF 126 ID corresponding to an ID of the AF 126 itself, an NF type which is to be requested (i.e., UPF 110 or SMF 108, NF which can be the NF type, and not being limited to the example above), a request result which is to be obtained through the Nnef_UPFDiscovery_Request request (i.e., values which can address or identify the NF for discovering an IP address, a fully qualified domain name (FQDN), or an NF ID, and not being limited to the values enumerated herein), and values which can specify the terminal, the PDU session, or the IP (QoS) flow (e.g., values such as the GPSI, UE IPv4 address(es), UE IPv6 prefix(es), UE MAC address(es), external group identifier, S-NSSAI, DNN, or indication, and not being limited to the values enumerated herein). The name of the message used to discover the serving UPF 110 or the serving SMF 108 is not limited to the example above, and may be changed to another name.

According to an embodiment, the AF 126 may determine, based on whether the service that the AF 126 is to subscribe to allows direct subscription, an NF (for example, a serving UPF 110 or a serving SMF 108), the identification information of which is to be requested, through the Nnef_UPFDiscovery_Request request message, and may determine, based thereon, information or a value to be included in the Nnef_UPFDiscovery_Request request message.

In stage 2, the NEF 116 having received the Nnef_UPFDiscovery_Request request message transmits, to the AF 126, an Nnef_UPFDiscovery_Request response message by including the NF type and one or more of the IP address, the FQDN, or the NF ID of the requested NF, according to the NF type and the desired request result.

When the AF 126 makes a request from the NEF 116 by including a public IP address of the terminal, the AF 126 may transmit an Nnrf_UPFDiscovery_Request request message to the NRF to discover the service UPF 110, based on the public IP address of the terminal.

In stage 3, the NRF may discover a UPF 110 in which an NAT having allocated the public IP address of the terminal is embedded, and transmit an ID of the corresponding UPF 110 to the NEF 116.

In stage 4, the NEF 116 may process a configuration request. When the AF 126 requests an ID of the NF such as an SMF 108 or a UPF 110, such ID of the NF may be information which is used within a network business operator only and cannot be exposed. To prevent exposure of such information, instead of transmitting the ID of the NF (e.g., UPF 110, SMF 108, etc.) to the AF 126, the NEF 116 may allocate a mapping ID for replacing each ID and transmit the mapping ID to the AF 126. A relationship between the NF ID and the mapping ID may be stored in configuration data in the form of a mapping table within the NEF 116.

In stage 5, the NEF 116 may transmit an Nnef_UPFDiscovery_Request Response message to the AF 126 by including the NF type and one or more of the IP address, the FQDN, or the NF ID of the requested NF, according to information requested by the AF 126, i.e., the NF type and the desired request result.

In a case where the information requested by the AF 126 is the NF ID, the mapping ID of the corresponding NF ID, allocated by the NEF 116 in stage 4, may be included instead of the NF ID and transmitted. In addition, according to another embodiment, also in a case where the FQDN or the IP address of the corresponding NF cannot be transmitted, the mapping ID of the corresponding NF may be included and transmitted, instead of such information.

In stage 3, the AF 126 transmits an Nnef_EventExposure_Subscribe/Unsubscribe request to the NEF 116. In this case, the Nnef_EventExposure_Subscribe/Unsubscribe request includes the NF type and the corresponding NF addressing/identification information received in stages 1 and 2.

For example, the AF 126 may transmit, to the NEF 116, the Nnef_EventExposure_Subscribe/Unsubscribe request including the NF type corresponding to the serving UPF 110 and the corresponding NF addressing/mapping identification information or the Nnef_EventExposure_Subscribe/Unsubscribe request including the NF type corresponding to the serving SMF 108 and the corresponding NF addressing/mapping identification information.

In addition, according to an embodiment of the disclosure, instead of going through the NEF 116 in stage 3, the Nnef_EventExposure_Subscribe/Unsubscribe request may be directly transmitted to the SMF 108 or the UPF 110.

The NEF 116 may change the mapping ID included in the message to the FQDN or the ID address of the corresponding NF or the NF ID.

When the service that the AF 126 is to subscribe to is the service which can be directly subscribed through the UPF 110 and the NF type of the message received by the NEF 116 in stage 3 is thus the UPF 110, the NEF 116 performs, through the Nupf_EventExposure_Subscribe/Unsubscribe request/response, service subscription requested by the AF 126 in stages 4A and 5A.

According to an embodiment of the disclosure, in stages 4A and 5A, the NEF 116 may transmit or receive the Nupf_EventExposure_Subscribe/Unsubscribe request/response to or from the UPF 110.

In stages 4B-1 and 2 and 5B-1 and 2, when the service that the AF 126 is to subscribe to is the service which cannot be directly subscribed through the UPF 110 and the NF type of the message received by the NEF 116 in stage 3 is thus the SMF 108, the NEF 116 transmits the Nsmf_EventExposure_Subscribe/Unsubscribe request/response message to the SMF 108 to indirectly perform, through the SMF 108, service subscription requested by the AF 126.

According to an embodiment of the disclosure, in stages 4B-1/2 and 5B-1/2, the NEF 116 may transmit or receive the Nupf_EventExposure_Subscribe/Unsubscribe request/response to or from the UPF 110 through the SMF 108.

In stage 6, the NEF 116 may transmit a UPF 110 service subscription result to the AF 126.

In stages 7 and 8, when an event of the service requested by the AF 126 occurs in the UPF 110, a notification thereof may be transmitted to the AF 126 through the NEF 116.

Figure 10:
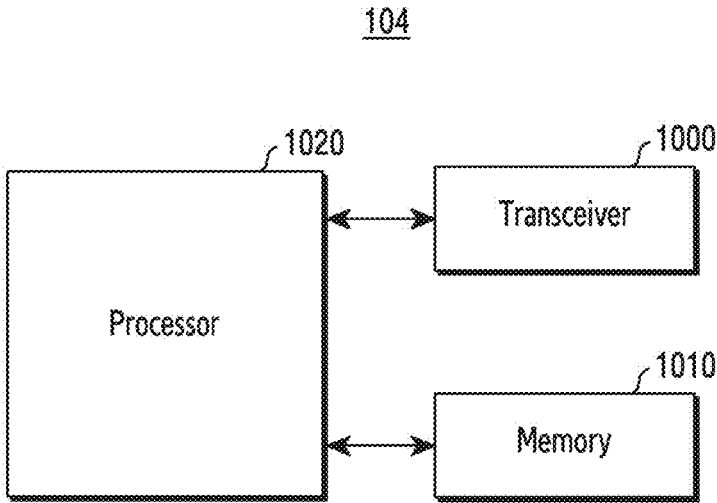
FIG. 10 illustrates a configuration of a terminal according to an embodiment of the disclosure.

FIG. 10 illustrates a configuration of a terminal according to an embodiment of the disclosure.

A terminal according to an embodiment of the disclosure may include a processor 1020 for controlling an overall operation of the terminal, a transceiver 1000 including a transmitter and a receiver, and memory 1010. The disclosure is not limited to the example above, and the terminal may include more elements or fewer elements than the elements illustrated in FIG. 10. The terminal described herein with respect to FIG. 10 may be terminal 104.

According to an embodiment of the disclosure, the transceiver 1000 may transmit or receive signals to or from network entities or other terminals. The signal transmitted or received to or from the network entities may include control information and data. In addition, the transceiver 1000 may receive the signals through radio channels, output the same to the processor 1020, and transmit the signals output from the processor 1020 through the radio channels.

According to an embodiment of the disclosure, the processor 1020 may control the terminal to perform an operation of one of the above-described embodiments. The processor 1020, the memory 1010, and the transceiver 1000 are not necessarily required to be implemented as separate modules, and may be implemented as one element in the form such as a single chip. The processor 1020 and the transceiver 1000 may be electrically connected. In addition, the processor 1020 may be an application processor (AP), a communication processor (CP), a circuit, an application-specific circuit, or at least one processor.

According to an embodiment of the disclosure, the memory 1010 may store data such as a basic program, an application program, and configuration information for operation of the terminal. Specifically, the memory 1010 provides data stored upon the request from the processor

1020. The memory 1010 may be a storage medium such as read only memory (ROM), random access memory (RAM), hard disks, compact disc (CD)-ROMs, and digital versatile discs (DVDs), or a combination of storage media. In addition, there may be multiple memories 1010. In addition, the processor 1020 may perform the above-described embodiments based on the program which is stored in the memory 1010 and performs the above-described embodiments of the disclosure.

Figure 11:
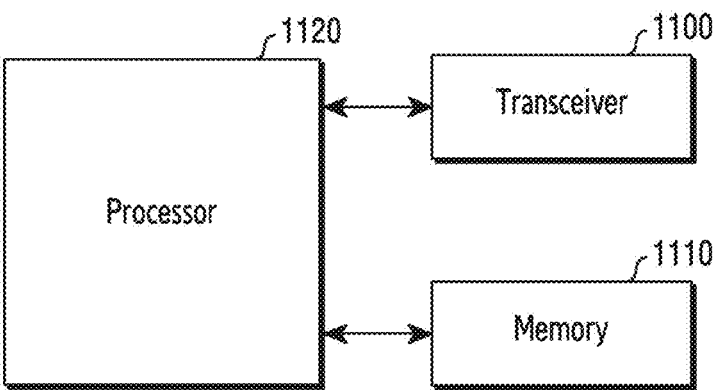
FIG. 11 illustrates a configuration of a base station or a network entity according to an embodiment of the disclosure.

FIG. 11 illustrates a configuration of a base station or a network entity according to an embodiment of the disclosure.

A network entity according to an embodiment of the disclosure may include a processor 1120 for controlling an overall operation of the network entity, a transceiver 1100 including a transmitter and a receiver, and memory 1110. The disclosure is not limited to the example above, and the network entity may include more elements or fewer elements than the elements illustrated in FIG. 11. The base station or a network entity described herein with reference to FIG. 11 may be any entity described herein other than the terminal 104.

According to an embodiment of the disclosure, the transceiver 1100 may transmit or receive signals to or from at least one of network entities or other terminals. The signal transmitted or received to or from the network entities may include control information and data.

According to an embodiment of the disclosure, the processor 1120 may control the network entity to perform an operation of one of the above-described embodiments. The processor 1120, the memory 1110, and the transceiver 1100 are not necessarily required to be implemented as separate modules, and may be implemented as one element in the form such as a single chip. The processor 1120 and the transceiver 1100 may be electrically connected. In addition, the processor 1120 may be an application processor (AP), a communication processor (CP), a circuit, an application-specific circuit, or at least one processor.

According to an embodiment of the disclosure, the memory 1110 may store data such as a basic program, an application program, and configuration information for operation of the network entity. Specifically, the memory 1110 provides data stored upon the request from the processor 1120. The memory 1110 may be a storage medium such as ROM, RAM, hard disks, CD-ROMs, and DVDs, or a combination of storage media. In addition, there may be multiple memories 1110. In addition, the processor 1120 may perform the above-described embodiments based on the program which is stored in the memory 1110 and performs the above-described embodiments of the disclosure.

It should be noted that the aforementioned diagrams, illustrations of control/data signal transmission methods, illustrations of operating procedures, and configurations are not intended to limit the scope of the disclosure, i.e., not all components, entities, or steps of operation described in the embodiments of the disclosure should be construed as essential components for practicing the disclosure, and only some of the components may be included without impairing the essence of the disclosure. Further, each embodiment may be operated in combination with each other as desired. For example, network entities and terminals may be operated in combination with some of the methods proposed herein.

The operations of the base station or terminal described above may be realized by providing a memory device storing the corresponding program code in any component of the base station or terminal In other words, the control portion of the base station or terminal may execute the operations described above by reading and executing the program code stored in the memory device by a processor or central processing unit (CPU).

The various components, modules, and the like of the entities, base stations, or terminals described herein may be operated using hardware circuitry, such as logic circuitry based on complementary metal oxide semiconductors, firmware, software, and/or a combination of hardware and firmware and/or software embedded in a machine-readable medium. For example, various electrical structures and methods may be implemented using electrical circuits such as transistors, logic gates, and custom semiconductors.

When implemented as software, a computer-readable storage medium storing one or more programs (software modules) may be provided. The one or more programs stored on the computer-readable storage medium are configured for execution by one or more processors in an electronic device. The one or more programs include instructions that cause the electronic device to perform methods according to the claims of the disclosure or embodiments described herein.

Such programs (software modules, software) may be stored in random access memory, non-volatile memory, including flash memory, read only memory (ROM), electrically erasable programmable ROM (EEPROM), or electrically erasable programmable memory (EEPROM): (EEPROM), electrically erasable programmable read only memory (EEPROM), magnetic disc storage device, compact disc ROM (CD-ROM), digital versatile discs (DVDs) or other forms of optical storage, magnetic cassette, or any combination of any or all of these. Alternatively, it may be stored in a memory comprising a combination of any or all of these. Further, there may be multiple of each of these configuration memories.

Further, the program may be stored on an attachable storage device that is accessible via a communication network, such as a communication network comprising the Internet, an intranet, a local area network (LAN), a wide area network (WAN), or a storage area network (SAN), or any combination thereof. Such a storage device may be accessible to a device practicing embodiments of the disclosure via an external port. Additionally, a separate storage device on a communication network may be accessible to the device performing the embodiments of the disclosure.

In the specific embodiments of the disclosure described above, the components included in the disclosure have been expressed in the singular or plural, depending on the specific embodiment presented. However, the singular or plural expression has been chosen for ease of description and to suit the context presented, and the disclosure is not limited to the singular or plural components, and components expressed in the plural may be comprised in the singular, or components expressed in the singular may be comprised in the plural.

In the detailed description of the disclosure, specific embodiments have been described, but various modifications are of course possible without departing from the scope of the disclosure. Therefore, the scope of the disclosure should not be limited to the described embodiments, but should be defined by the scope of the patent claims that follow, as well as by those that are coextensive with the scope of the claims. That is, it will be apparent to those having ordinary knowledge in the technical field to which the disclosure belongs that other variations based on the technical ideas of the disclosure are possible. Furthermore, each of the above embodiments can be operated in combination with each other as needed. For example, base stations and terminals may be operated in combination with some of the methods proposed herein. Furthermore, while the above embodiments are presented based on 5G and NR systems, other variations based on the technical ideas of the above embodiments may be implemented in other systems, such as long term evolution (LTE), LTE-advanced (LTE-A), LTE-A-Pro systems, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a serving user plane function (UPF) entity in a wireless communication system, the method comprising:
   receiving, from an application function (AF) entity, a request message for requesting a discovery on the serving UPF entity or a session management function (SMF) entity, for a subscription on a service of the AF entity; and
   transmitting, to a network exposure function (NEF) entity, a response message including a type of a network function (NF) entity and information for identifying the NF entity corresponding to the type of the NF entity.

2. The method of claim 1, further comprising:
   identifying the information for identifying the NF entity corresponding to the type of the NF entity, which is included in the response message, as any one of information for identifying the serving UPF entity and information for identifying the SMF entity, based on information on the type of the NF entity,
   wherein the request message includes at least one of an identifier of the AF entity, the information on the type of the NF entity associated with the discovery, a request for information for identifying the NF entity, or a value identifying at least one of a user equipment associated with the service, a protocol data unit (PDU) session, or a quality of service (QOS) flow, and
   wherein the information for identifying the NF entity corresponding to the type of the NF entity is replaced by a mapping identifier which is mapped to the information for identifying the NF entity corresponding to the type of the NF entity.

3. The method of claim 2, further comprising:
   receiving, from the AF entity, a service subscription request message including a mapping identifier which is mapped to the information for identifying the serving UPF entity; and
   transmitting, to the AF entity, a service subscription response message.

4. The method of claim 3, further comprising:
   transmitting, to the NEF entity, a notification message notifying an occurrence of an event associated with the service.

5. The method of claim 1, wherein a mapping table including at least one mapping relation between the information for identifying the NF entity corresponding to the type of the NF entity and a mapping identifier is configured.

6. A method performed by an application function (AF) entity in a wireless communication system, the method comprising:
   transmitting, to a serving user plane function (UPF) entity, a request message for requesting a discovery on the serving UPF entity or a session management function (SMF) entity, for a subscription on a service of the AF entity; and receiving, from a network exposure function (NEF) entity, a response message including a type of a network function (NF) entity and a mapping identifier which is mapped to information for identifying the NF entity corresponding to the type of the NF entity.

7. The method of claim 6, further comprising:

identifying the type of the NF entity associated with the discovery as any one of the serving UPF entity or the SMF entity, based on whether the service is a service to which the AF entity is able to subscribe directly to the serving UPF entity or a service to which the AF entity is able to subscribe indirectly via the SMF entity to the serving UPF entity, wherein the request message includes at least one of an identifier of the AF entity, information on the type of the NF entity associated with the discovery, a request for information for identifying the NF entity, or a value identifying at least one of a user equipment associated with the service, a protocol data unit (PDU) session, or a quality of service (QOS) flow, and wherein the information for identifying the NF entity corresponding to the type of the NF entity is replaced by the mapping identifier.

8. The method of claim 7, further comprising:

transmitting, to the NF entity corresponding to the type of the NF entity, a service subscription request message including the mapping identifier which is mapped to the information for identifying the NF entity corresponding to the type of the NF entity, wherein based on an identification result on the type of the NF entity, the mapping identifier which is mapped to the information for identifying the NF entity includes a mapping identifier which is mapped to information for identifying the serving UPF entity or a mapping identifier which is mapped to information for identifying the SMF entity; and receiving, from the NF entity corresponding to the type of the NF entity, a service subscription response message.

9. The method of claim 8, further comprising:

receiving, from the NEF entity, a notification message notifying an occurrence of an event associated with the service.

10. The method of claim 6, wherein a mapping table including at least one mapping relation between the information for identifying the NF entity corresponding to the type of the NF entity and the mapping identifier is configured.

11. A serving user plane function (UPF) entity comprising:

at least one transceiver;

at least one processor communicatively coupled to the at least one transceiver; and at least one memory, communicatively coupled to the at least one processor, storing instructions executable by the at least one processor individually or in any combination to cause the serving UPF entity to:

receive, from an application function (AF) entity, a request message for requesting a discovery on the serving UPF entity or a session management function (SMF) entity, for a subscription on a service of the AF entity, and transmit, to a network exposure function (NEF) entity, a response message including a type of a network function (NF) entity and information for identifying the NF entity corresponding to the type of the NF entity.

12. The serving UPF entity of the claim 11, wherein the instructions further cause the serving UPF entity to:

identify the information for identifying the NF entity corresponding to the type of the NF entity, which is included in the response message, as any one of information for identifying the serving UPF entity and information for identifying the SMF entity, based on information on the type of the NF entity, wherein the request message includes at least one of an identifier of the AF entity, the information on the type of the NF entity associated with the discovery, a request for information for identifying the NF entity, or a value identifying at least one of a user equipment associated with the service, a protocol data unit (PDU) session, or a quality of service (QOS) flow, and wherein the information for identifying the NF entity corresponding to the type of the NF entity is replaced by a mapping identifier which is mapped to the information for identifying the NF entity corresponding to the type of the NF entity.

13. The serving UPF entity of the claim 12, wherein the instructions further cause the serving UPF entity to:

receive, from the AF entity, a service subscription request message including a mapping identifier which is mapped to the information for identifying the serving UPF entity, and transmit, to the AF entity, a service subscription response message.

14. The serving UPF entity of the claim 13, wherein the instructions further cause the serving UPF entity to:

transmit, to the NEF entity, a notification message notifying an occurrence of an event associated with the service.

15. The serving UPF entity of the claim 11, wherein a mapping table including at least one mapping relation between the information for identifying the NF entity corresponding to the type of the NF entity and a mapping identifier is configured.

16. An application function (AF) entity comprising:

at least one transceiver;

at least one processor communicatively coupled to the at least one transceiver; and at least one memory, communicatively coupled to the at least one processor, storing instructions executable by the at least one processor individually or in any combination to cause the AF entity to:

transmit, to a serving user plane function (UPF) entity, a request message for requesting a discovery on the serving UPF entity or a session management function (SMF) entity, for a subscription on a service of the AF entity, and receive, from the serving UPF entity, a response message including a type of a network function (NF) entity and a mapping identifier which is mapped to information for identifying the NF entity corresponding to the type of the NF entity.

17. The AF entity of claim 16, wherein the instructions further cause the AF entity to:

identify the type of the NF entity associated with the discovery as any one of the serving UPF entity or the SMF entity, based on whether the service is a service to which the AF entity is able to subscribe directly to the serving UPF entity or a service to which the AF entity is able to subscribe indirectly via the SMF entity to the serving UPF entity, wherein the request message includes at least one of an identifier of the AF entity, information on a type of a network function (NF) entity associated with the discovery, a request for information for identifying the NF entity, or a value identifying at least one of a user equipment associated with the service, a protocol data unit (PDU) session, or a quality of service (QOS) flow, and wherein the information for identifying the NF entity corresponding to the type of the NF entity is replaced by the mapping identifier.

18. The AF entity of claim 17, wherein the instructions further cause the AF entity to:

transmit, to the NF entity corresponding to the type of the NF entity, a service subscription request message including the mapping identifier which is mapped to the information for identifying the NF entity corresponding to the type of the NF entity, wherein based on an identification result on the type of the NF entity, the mapping identifier which is mapped to the information for identifying the NF entity includes a mapping identifier which is mapped to information for identifying the serving UPF entity or a mapping identifier which is mapped to information for identifying the SMF entity, and receive, from the NF entity corresponding to the type of the NF entity, a service subscription response message.

19. The AF entity of claim 18, wherein the instructions further cause the AF entity to:

receive, from a network exposure function (NEF) entity, a notification message notifying an occurrence of an event associated with the service.

20. The AF entity of claim 16, wherein a mapping table including at least one mapping relation between the information for identifying the NF entity corresponding to the type of the NF entity and the mapping identifier is configured.

* * * * *